United States Patent [19]

Ebert

[11] 4,052,592
[45] Oct. 4, 1977

[54] DEVICE FOR HEATING THERMOPLASTIC EYEGLASS FRAMES

[76] Inventor: Edward A. Ebert, 203 Huxley Drive, Snyder, N.Y. 14226

[21] Appl. No.: 743,286

[22] Filed: Nov. 19, 1976

[51] Int. Cl.$^2$ .............................................. H05B 3/06
[52] U.S. Cl. ...................................... 219/521; 81/3.5; 219/343; 219/354; 219/386; 432/225
[58] Field of Search ................. 29/20; 81/3.5; 34/107; 99/331, 389, 392; 219/216, 302, 340, 342, 345, 346, 348, 354, 385, 386, 388, 400, 411, 470, 521, 525, 527, 530, 540; 351/88; 432/225

[56] References Cited

U.S. PATENT DOCUMENTS

| | | | |
|---|---|---|---|
| 2,735,921 | 2/1956 | Edgerton | 219/342 X |
| 3,003,409 | 10/1961 | Mills | 99/331 |
| 3,244,859 | 4/1966 | Whiteford | 219/348 |
| 3,269,224 | 8/1966 | Magee | 81/3.5 |
| 3,329,801 | 7/1967 | Shannon et al. | 219/388 |
| 3,359,404 | 12/1967 | Limberger | 219/216 |
| 3,475,590 | 10/1969 | Pins | 219/521 X |
| 3,515,853 | 6/1970 | McAdams | 219/346 |
| 3,564,202 | 2/1971 | Oppenheim | 219/400 |
| 3,732,066 | 5/1973 | Kipper et al. | 432/225 X |
| 3,816,705 | 6/1974 | Ebert | 219/521 |

Primary Examiner—Volodymyr Y. Mayewsky

[57] ABSTRACT

A device for heating a thermoplastic eyeglass frame having a rim and bridge portion and a temple portion, includes a housing having a pair of spaced infrared heat radiating surfaces mounted therein. The surfaces form an open-ended channel therebetween for receiving one of the eyeglass frame portions while permitting the other of said frame portions to remain out of range of the heat radiating surfaces. The heat radiating surfaces comprise spaced external surfaces on a heating block having a heating element embedded therein. The front radiating surface is larger than the rim and bridge portion of the frames while the rear radiating surface is smaller than the rim and bridge portion, for allowing the temple portions of the frames to extend beyond the rear radiating surface without exposure to that radiation. The rear radiating surface is small enough to fit between the temples of the smallest eyeglass frames in use but have their ends formed to radiate infrared rays in a diverging conformation to reach out and meet with the radiation of the larger front radiator, to thus accommodate radiation of and heating of any size eyeglass frames from the largest to the smallest in use.

4 Claims, 5 Drawing Figures

DEVICE FOR HEATING THERMOPLASTIC EYEGLASS FRAMES

This application is a continuation-in-part of application Ser. No. 475,651 filed June 3, 1974 now U.S. Pat. No. 4,007,370.

The invention of the instant application relates to a device for softening a plastic opthalmic frame or other similiar plastic article requiring heating and softening. More particularly it relates to a device which can be used with a wide range of eyeframes from adult size down to infant size.

In my U.S. Pat. No. 3,816,705 there is described a device for heating a thermoplastic eyeglass frame in an open ended channel formed by spaced infrared heat radiating surfaces mounted in a housing. The frontal lens holding portion can be placed in the channel for heating while the temple portions are outside of the channel or a temple portion can be placed in the channel for heating and the frontal lens and other temple portions held outside of the channel.

My copending application Ser. No. 475,651 describes a specific construction and mode of operation of infrared radiators and support means for holding an article or opthalmic eyeglass frame in proper orientation while being heated.

The instant application, functions similiarly to U.S. Pat. No. 3,816,705 and Ser. No. 475,651 but is concerned with radiator configuration and size relative to opthalmic frames and intends for an operators holding of the frames rather than the mechanical means described and illustrated in application Ser. No. 475,651.

BACKGROUND OF THE INVENTION

The present invention particularly relates to a machine used in the opthalmic profession for the fitting and/or glazing of lenses in eyeglass frames. These frames made of thermoplastic materials must be properly warmed to soften them to allow insertion of the lenses or to bend and form them to fit the face and head of the user. The warming of frames has been accomplished in many ways, such as by hot plates, hot air blowers, and infrared lamps, but none of these means were satisfactory regarding temperature and many times burned the plastic since they did not have temperature controlled heat.

A prime object of this invention is to provide a machine of a single size for use on eyeglass frames either large or small or any size between, without the need for adapters, enlargers, reducers or a special size machine for that particular size of frame.

Another object of this invention is the use of a larger and a smaller radiator, the larger for radiation of the outside of the eyeglass frame while the smaller radiates the inside of the frame.

Another object of this invention is to use a smaller and a larger radiator for the purpose of accomodating the smallest and the largest sizes of eyeglass frames.

Still another object of this invention is to provide the smaller radiator with lenticulated ends, or convex ends to project the infrared radiation of these ends out to the extremity of the larger radiator to match the extent of its radiation.

Another object is to provide both radiators with ends formed to diverge or extend the radiation from each of their four ends.

Another object is to provide a larger radiator with concave surfaces and a smaller radiator with convex surfaces, for receiving larger or smaller articles or for reception of curved or rounded frames.

SUMMARY

The present invention relates to a device for softening a plastic opthalmic frame comprising a housing, an infrared heat radiating surface on said housing, electrical heating means for exciting the radiating surface and the capability of allowing an operator to position and hold the frame in selected positions for exposure of its various portions to heat rays for softening. More specifically a portion of an eyeglass frame is held in a channel formed by the heat radiating surface and exposed to heat while being hand held by another portion outside of the heating channel. One side of the channel is longer than the other to allow eyeglass frames to be placed in the channel for radiation from both sides while the temples, for example, extend away from the longer side and around and beyond the shorter side unexposed to the radiant heat. The shorter side has ends formed to extend their radiation to at least the same length as the longer side.

BRIEF DESCRIPTION OF THE DRAWINGS

The present invention, as well as further objects and features thereof, will be understood more clearly and fully from the following detailed description of the preferred embodiment, when read in conjunction with the accompanying drawings, in which.

GENERAL OPERATION

Figure 1:
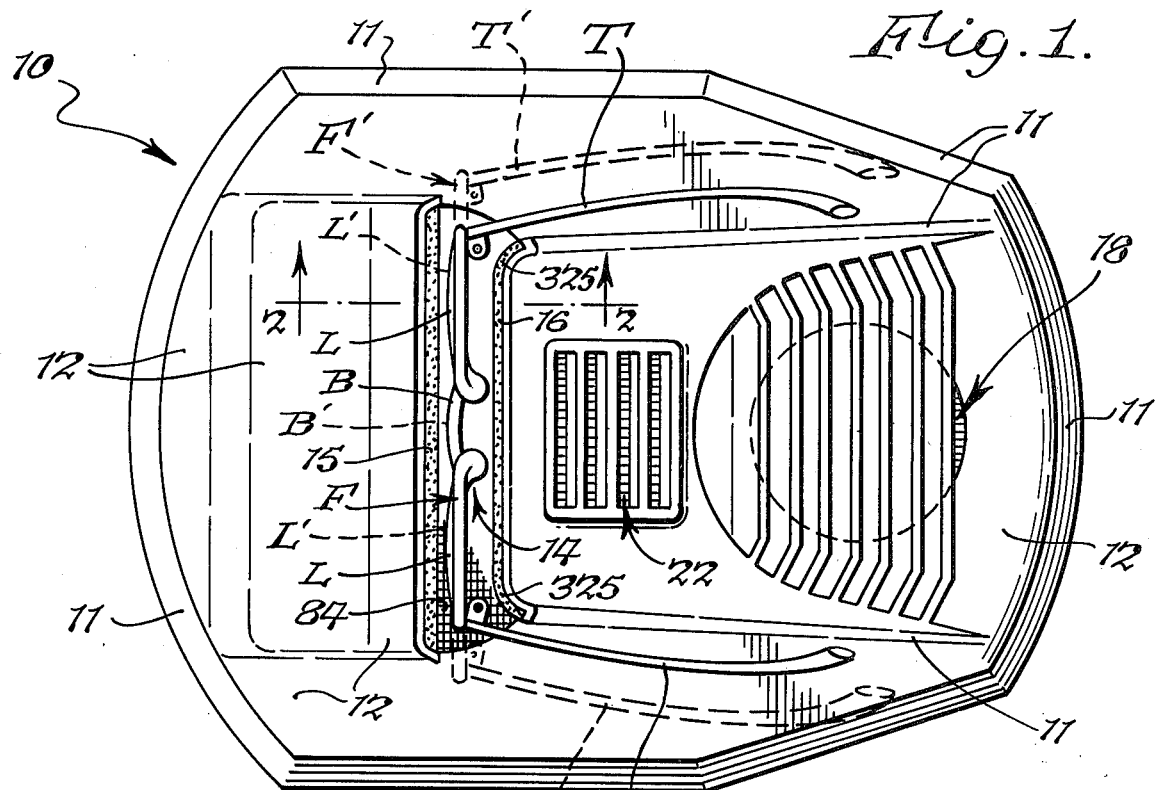
FIG. 1 is a top plan view of the device.
Figure 2:
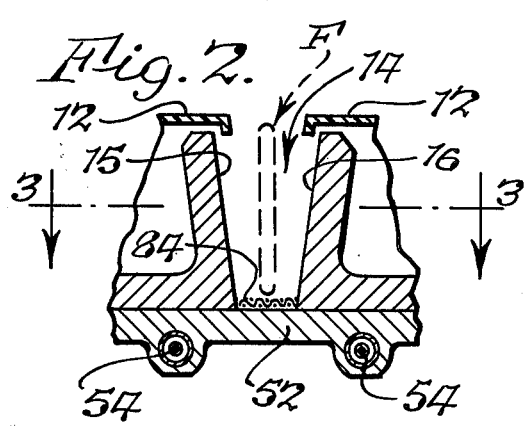
FIG. 2 is a fragmentary vertical section taken along line 2—2 in FIG. 1.
Figure 3:
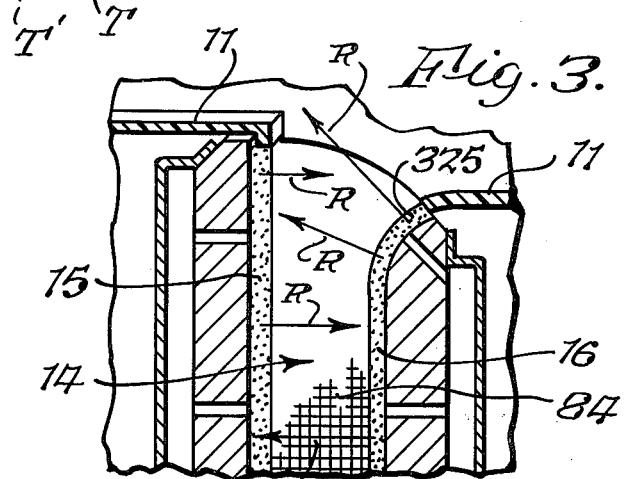
FIG. 3 is an elarged, fragmentary, horizontal section taken on line 3—3 in FIG. 2.

The machine housing 10 illustrated in FIGS. 1-3 comprises side walls 11 which rise to a top wall 12 and then to a higher top wall 12 through which a channel 14 is provided. In this channel 14 which is open at both ends are infrared radiators 15 and 16 which are heated by an electrical heating element 54 and this top wall 12 is further perforated with a louvered opening 22 through which a jet of cooling air is exhausted, while another louvered opening 18 provides an air intake for the housing 10. The specific construction and mode of operation of infrared radiators 15 and 16 is disclosed in detail in my U.S. Pat. No. 3,816,705. This patent bore the application Ser. No. 207,086 at the time of the filing of the parent case Ser. No. 475,651 of which this instant case is a continuation-in-part. This information is incorporated here by reference, insofar as it is required for a better understanding of the present subject matter.

As will be seen in FIG. 1, a small eyeglass frame F is shown in full lines and a larger frame F' is shown in broken lines. The frames have a rim and bridge portion B, B' holding lenses L, L' and is shown as being held in the open channel 14 with the temple portions T, T' shown extending along the sides 11 toward the rear or to the right in FIG. 1, where the intake 18 and the exhaust 22 are located.

The frames F are held in the channel in spaced relation to each of the radiators 15, 16 and the bottom 52 by the operator holding either one or both of the temples T in his fingers. It should be noted that the operators hands and fingers are well away from and not exposed to the heat rays from radiators 15 and 16 because they are along the side walls 11 of the housing at the exhaust 22 and intake 18 locations.

Similarly the temple portions T may be placed in the channel 14 by the operator holding the frame F by the rim and bridge portion B, again with his fingers protected from and away from the heat radiation.

It will be noted in FIG. 1 that the radiator 15 at the left or front of the machine is longer than the radiator 16 at the right. This radiator 16 is not only shorter but has exposed, convex contoured ends 325. In the enlarged view of FIG. 9 it can be clearly seen that radiation indicated by the arrows R radiates into the channel toward the opposed radiators 15 and 16. At the ends 325 of the shorter radiator 16 the the contoured surface directs radiation out and beyond the physical end 325 toward the longer radiator 15 in diverging rays.

Looking at FIG. 1 it can be seen that the shorter radiator 16 can be made short enough to allow a small eyeglass frame F to fit round it and get radiation throughout the length of the rim and bridge portion B, both on the outside and the inside. Similiarly the frame F' in dotted lines, a much larger size and having a longer bridge portion B' and extending beyond both ends 325 of radiator 16 can get radiation from the shorter inside radiator 16 because of its diverted radiation beyond its ends.

Thus with a long outside radiator 15 and a short inside radiator 16 with contoured ends 325 a machine can be built to meet the needs of both small and large eyeglass frames F and F'. As can be seen in FIG. 1 of U.S. Pat. No. 3,816,705 with equal length radiators, the inside dimension between the temple portions determines the size of the inside radiator and thus the machine could not heat the bridge and rim portions at the extreme ends of a larger size if made for a small size frame. Conversely if a machine is built for larger frames it would not accept small frames because the temples would not physically fit over the inside radiator.

To alleviate accidental contact and possible marring of the frames F, an insulated covering 84 is placed on the bottom 52 of the channel 14.

Figure 4:
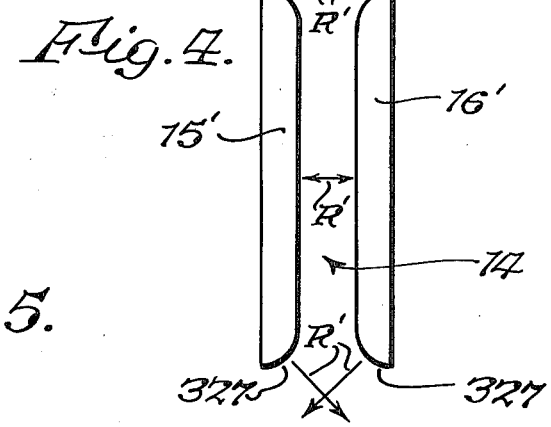
FIG. 4 is a diagramatic showing of a pair of radiators, having ends that divert heat rays beyond their physical extremities.

In the modified form shown in FIG. 4, both radiators front 15' and rear 16' have their ends 327 contoured in such a manner that they radiate diverging rays R' beyond their physical endings to cross in an oblique manner, so that if desired both radiators may be made physically shorter than the physical length of an article such as the rim and bridge portion B of a pair of eyeglass frames F.

Figure 5:
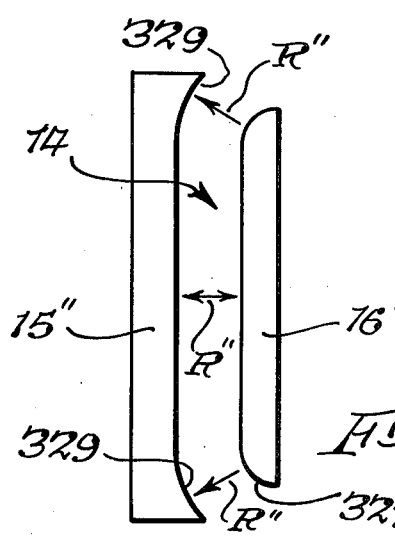
FIG. 5 is another diagramatic showing of an embodiment having a cancave radiator and a complimentary convex radiator.

A further modified form of radiator is shown in FIG. 5 where the front radiator 15" having a concave configuration created by the concavely curved ends 329, while the rear radiator 16" is of a convex configuration created by the convexly curved ends 327, both having intermediate flat or curved areas in between. Arrows R" illustrate how the curved surfaces 329 and 327 may, if desired, be made to radiate at each other in matched relationship, thus giving radiation to either smaller or larger sizes of eyeglass frames or frames of a curved nature.

From the foregoing it may be concluded that eyeglass frames or other similar articles having U shaped configurations and of many size variations can be heated or radiated by a single size machine.

The terms and expressions which have been employed are used as terms of description and not of limitation, and there is no intention, in the use of such terms and expressions, of excluding any equivalents of the features shown and described, or portions thereof, it being recognized that various modifications are possible within the scope of the invention claimed.

What is claimed is:

1. A radiant type heater for heating an opthalmic frame having a frontal lens holding portion and a temple portion comprising a housing, electrical heating means and heat transfer means for transferring heat to first and second opposed heat radiating surfaces on said housing for receiving said frontal lens holding portion therebetween, said first heat radiating surface having opposite extreme outer ends with at least one extreme outer end being of a configuration to extend radiation beyond said one extreme outer end to meet radiation from said second heat radiating surface, said first heat radiating surface being of a dimension to permit said temple portions to be placed outside of said extreme outer ends of said first heat radiating surface and to also permit a portion of said frontal lens holding portion to be placed outside of said one extreme outer end of said first heat radiating surface, whereby said one extreme outer end will heat said portion of said frontal lens holding portion which extends beyond said one extreme outer end of said first radiating surface.

2. A radiant type heater as set forth in claim 1 wherein said first radiating surface is shorter than said second radiating surface.

3. A radiant type heater as set forth in claim 1 wherein said first and second radiating surface are of equal length, each having at least one extreme outer end portion formed to extend radiation beyond said extreme outer end portions, said radiation from each meeting and crossing in an oblique manner.

4. A radiant type heater as set forth in claim 1 wherein said second radiating surface has a concave radiating surface and said first radiating surface has a convex radiating surface, with said convex and concave surfaces facing each other to compliment the radiation of each other on said article.

* * * * *